(12) United States Patent
Yoon et al.

(10) Patent No.: US 9,599,173 B2
(45) Date of Patent: Mar. 21, 2017

(54) METHOD FOR PREVENTING BAULKING OF DCT FOR VEHICLE

(71) Applicant: HYUNDAI MOTOR COMPANY, Seoul (KR)

(72) Inventors: Young Min Yoon, Suwon-si (KR); Sung Hyun Cho, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/947,546

(22) Filed: Nov. 20, 2015

(65) Prior Publication Data
US 2016/0377130 A1    Dec. 29, 2016

(30) Foreign Application Priority Data
Jun. 26, 2015    (KR) .................. 10-2015-0091355

(51) Int. Cl.
*B60W 10/00*    (2006.01)
*F16D 48/06*    (2006.01)
*F16H 61/688*    (2006.01)

(52) U.S. Cl.
CPC ......... *F16D 48/068* (2013.01); *F16H 61/688* (2013.01); *F16D 2500/1083* (2013.01); *F16D 2500/10412* (2013.01); *F16D 2500/31466* (2013.01); *F16D 2500/50653* (2013.01)

(58) Field of Classification Search
None
See application file for complete search history.

(56) References Cited

U.S. PATENT DOCUMENTS

| | | | | |
|---|---|---|---|---|
| 4,723,643 A * | 2/1988 | Numazawa | ............ | B60K 17/02 192/3.58 |
| 5,595,550 A | 1/1997 | Jarvis et al. | | |
| 7,044,280 B2 * | 5/2006 | Budal | .................... | B60K 28/16 192/110 R |
| 7,252,621 B2 * | 8/2007 | Tanba | .................. | B60W 10/113 477/77 |
| 7,488,272 B2 * | 2/2009 | Bothe | .................. | B60W 10/06 477/175 |
| 7,597,020 B2 * | 10/2009 | Baldwin | .............. | B60W 10/113 74/330 |
| 8,205,516 B2 * | 6/2012 | Kobayashi | .......... | F16H 61/0403 74/331 |

FOREIGN PATENT DOCUMENTS

| | | |
|---|---|---|
| JP | 2009-127690 A | 6/2009 |
| KR | 10-2012-0038797 A | 4/2012 |
| KR | 10-2014-0049856 A | 4/2014 |
| KR | 10-1383723 B1 | 4/2014 |

* cited by examiner

*Primary Examiner* — Dirk Wright
(74) *Attorney, Agent, or Firm* — Brinks Gilson & Lione

(57) ABSTRACT

A method for reducing baulking of a dual clutch transmission ("DCT") for a vehicle includes a first engaging step engaging an odd-stage clutch and an even-stage clutch of a DCT in a case of an ignition-on state. An ascertaining step ascertains a range positioned by a shift lever when an engine is cranked after the first engaging step. A second engaging step engages shift gears respectively, after disengaging at least one of the odd-stage clutch and the even-stage clutch depending on the ascertained range position of the shift lever.

7 Claims, 3 Drawing Sheets

FIG. 1

(Prior Art)

| Engine Cranking | Lever Position | Gear Odd | Gear Even | Cluch Odd | Cluch Even |
|---|---|---|---|---|---|
| Non Cranking | P | N | N | Open | Open |
| | R | N | N | Open | Open |
| | N | N | N | Open | Open |
| | D | N | N | Open | Open |
| Cranking | P | 1 | R | Open | Open |
| | R | N | R | Open | Close |
| | N | 1 | N | Open | Open |
| | D | 1 | N | Close | Open |

FIG.3

| Engine Cranking | Lever Position | Gear Odd | Gear Even | Cluch Odd | Cluch Even |
|---|---|---|---|---|---|
| Non Cranking | P | N | N | Close | Close |
| | R | N | N | Close | Close |
| | N | N | N | Close | Close |
| | D | N | N | Close | Close |
| Cranking | P | 1 | R | Open | Open |
| | R | N | R | Close | Open |
| | N | 1 | N | Open | Close |
| | D | 1 | N | Close | Close |

METHOD FOR PREVENTING BAULKING OF DCT FOR VEHICLE

CROSS-REFERENCE TO RELATED APPLICATIONS

The application claims the benefit of Korean Patent Application No. 10-2015-0091355, filed on Jun. 26, 2015, the contents of which are incorporated herein by reference in their entirety.

FIELD

The present disclosure relates to a method for reducing the baulking phenomenon of a dual clutch transmission (DCT) for a DCT-mounted vehicle.

BACKGROUND

The statements in this section merely provide background information related to the present disclosure and may not constitute prior art.

FIG. 1 is a table describing a conventional dual clutch transmission ("DCT") control method depending on whether an engine cranking of a DCT-mounted vehicle has been performed or not. In the case that the engine cranking has not performed on an ignition-on state, both of an odd-stage clutch and an even-stage clutch of DCT are disengaged and all of odd shift gears and even shift gears are at neutral positions wherever a shift lever is positioned at any one of all the shift ranges P, R, N, D.

Particularly, since the DCT has structural characteristics of a manual transmission, baulking phenomenon that shift gears do not normally engage with each other during change of shift stages, may occur. This is interference phenomenon between shift gears, i.e. a sleeve and a clutch gear and generally occurs in a frequency of 1% during change of shift stages in the manual transmission. For releasing the baulking phenomenon, after returning the sleeve to neutral position, arranging gears by rotating clutch, and then trying to engage the shift gears again, the sleeve can normally engage with the clutch gear.

The above mentioned procedures have been usually called as a baulking releasing logic, and it is possible for a driver to misunderstand the baulking phenomenon as a shifting delay and possible malfunction of a vehicle since the releasing logic occasionally needs about 4 to 5 times of duration than that of normal engaging of shift gears. Further, logic was developed to inhibit the baulking phenomenon because the baulking phenomenon may affect a delay of gear shifting or an abrupt starting of a vehicle to deteriorate the marketability of a vehicle.

SUMMARY

Accordingly, the present disclosure provides a method for reducing the baulking phenomenon for a DCT-mounted vehicle capable of reducing the probability of occurrence of gear baulking phenomenon by controlling of clutches after engaging of a plurality of the clutches when a DCT-mounted vehicle is at an ignition-on state.

A method for preventing baulking of DCT for a vehicle according to one form of the present disclosure may include: a first engaging step of engaging an odd-stage clutch and an even-stage clutch of a DCT; an ascertaining step of ascertaining a range positioned by a shift lever when an engine is cranked after the first engaging step; and a second engaging step of engaging shift gears respectively, after disengaging at least one of the odd-stage clutch and the even-stage clutch depending on the ascertained range of the shift lever.

When the position of the shift lever is ascertained as a P range by the ascertaining step, the second engaging step may engage 1st stage shift gears and R stage shift gears respectively, after disengaging both of the odd-stage clutch and the even-stage clutch.

When the position of the shift lever is ascertained as an N range by the ascertaining step, the second engaging step may engage 1st stage shift gears after disengaging the odd-stage clutch, maintains the even-stage clutch engaged, and leaves even shift gears at neutral position.

The method may further include a re-ascertaining step of ascertaining again a range positioned by the shift lever after the second engaging step; and a third engaging step of engaging shift gears respectively, after disengaging at least one of the odd-stage clutch and the even-stage clutch depending on the re-ascertained range of the shift lever.

When the position of the shift lever is re-ascertained as a P range by the re-ascertaining step, the third engaging step may engage 1st stage shift gears after disengaging the odd-stage clutch.

When the position of the shift lever is re-ascertained as an R range by the re-ascertaining step, the third engaging step may engage R stage shift gears after disengaging the even-stage clutch and moves odd shift gears to neutral position after disengaging the odd-stage clutch.

When the position of the shift lever is re-ascertained as an N range or a D range by the re-ascertaining step, the third engaging step may engage 1st stage shift gears after disengaging the odd-stage clutch and moves even shift gears to neutral position after engaging the even-stage clutch.

By the method for reducing baulking of DCT for a vehicle according to the exemplary forms of the present disclosure, it is possible to reduce the probability of occurrence of gear baulking phenomenon in a DCT-mounted vehicle, and thus improve the marketability of a vehicle by shortening engaging times of shift gears and reducing delays of shifting and abrupt starting of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a table describing a conventional DCT control method for a vehicle depending on cranking state of a vehicle;

FIG. 3 is a table describing a DCT control method according to one form of the present disclosure.

DETAILED DESCRIPTION

Figure 2:
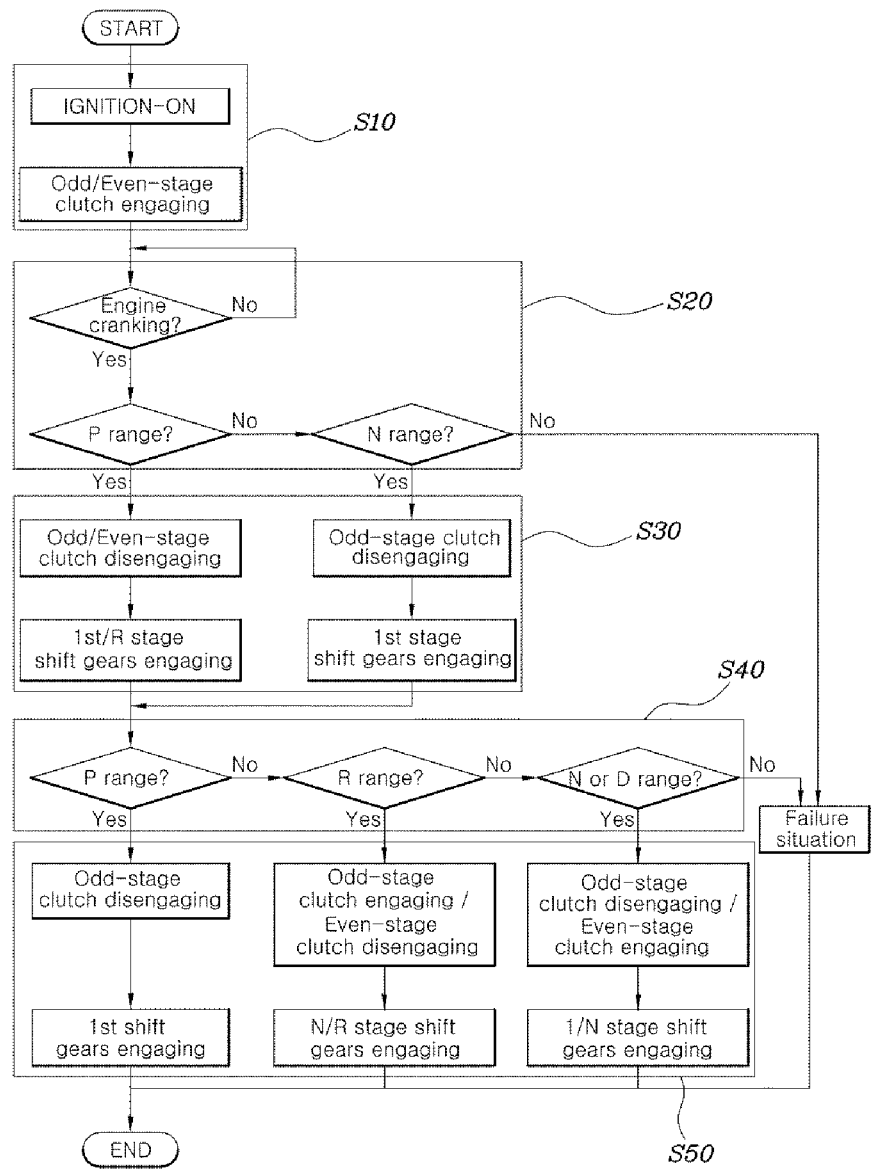
FIG. 2 is a flow chart of a method for preventing baulking of DCT for a vehicle according to one form of the present disclosure.

The following description is merely exemplary in nature and is not intended to limit the present disclosure, application, or uses. It should be understood that throughout the drawings, corresponding reference numerals indicate like or corresponding parts and features.

Hereinafter, a method for reducing baulking of a dual clutch transmission ("DCT") for a vehicle according to forms of the present disclosure will be described in detail with reference to the accompanying drawings.

FIG. 2 is a flow chart of a method for reducing baulking of the DCT for a vehicle according to one form of the present disclosure, and FIG. 3 is a table describing a DCT control method according to one form of the present disclosure. Referring to FIG. 2 and FIG. 3, a method for reducing baulking of the DCT for a vehicle may include a first engaging step S10 engaging an odd-stage clutch and an even-stage clutch of the DCT; an ascertaining step S20 ascertaining a range positioned by a shift lever when an engine is cranked after the first engaging step S10; and a second engaging step S30 engaging shift gears respectively, after disengaging at least one of the odd-stage clutch and the even-stage clutch depending on the ascertained range of the shift lever.

The DCT may include a plurality of clutches, i.e. an odd-stage clutch and an even-stage clutch.

In order to reduce the baulking phenomenon of in the DCT-mounted vehicle, to begin with, engaging the odd-stage clutch and the even-stage clutch is performed when the vehicle becomes ignition-on. Then, all shift gears, odd shift gears and even shift gears, are at neutral positions respectively. After then, when an engine of the vehicle is cranked, the odd-stage clutch and the even-stage clutch are rotated, and then each shift gears may be engaged after disengaging at least one of the clutches depending on the position of a shift lever. Since the clutches are rotated by inertia freely, it is possible to reduce the probability of baulking occurrence of gears more than the conventional structure.

Therefore, it is possible to improve marketability of a vehicle by reducing the delay of shifting and abrupt starting of the vehicle which can occur by the baulking phenomenon of shift gears.

Specifically, when the shift lever is positioned at P range as the result of performing the ascertaining step S20, the second engaging step S30 may engage 1st stage shift gears and R stage shift gears respectively, after disengaging both of the odd-stage clutch and the even-stage clutch.

That is, when an engine of a vehicle is cranked after ignition-on, in the case that the shift lever is positioned at P range, it is not typically possible to know that the vehicle is about to drive forward or rearward. So, the 1st stage shift gears and the R stage shift gears are engaged respectively after both of the odd-stage clutch and the even-stage clutch are disengaged from the engaged state. At this time, the odd-stage clutch and the even-stage clutch are in a rotating state by their rotating inertia in the case that the clutches are disengaged from the engaged state. The rotating state of the clutches may reduce the probability of occurrence of the baulking phenomenon of the 1st stage shift gears and the R stage shift gears.

Meanwhile, when the position of the shift lever is ascertained as an N range by the ascertaining step S20, the second engaging step S30 may engage the 1st stage shift gears after disengaging the odd-stage clutch, maintains the even-stage clutch engaged, and leaves even-stage shift gears at neutral position.

That is, since the possibility of forward driving by a driver is considered as high in the case that the shift lever is positioned at N range, 1st stage shift gears are engaged after disengaging the odd-stage clutch from engaging state. In this case, the odd-stage clutch is in a rotating state by its rotating inertia in the case that the odd-stage clutch is disengaged from the engaged state. The rotating state of the odd-stage clutch may reduce the probability of occurrence of the baulking phenomenon of the 1st stage shift gears. Meanwhile, it is possible to prepare for baulking phenomenon from later engaging shift gears with rotation of the even-stage clutch by maintaining the engaged state of the even-stage clutch.

The method of the present disclosure may further include a re-ascertaining step S40 ascertaining again a range positioned by the shift lever after the second engaging step S30; and a third engaging step S50 engaging shift gears respectively, after disengaging at least one of the odd-stage clutch and the even-stage clutch depending on the re-ascertained range of the shift lever.

That is, since the baulking phenomenon may occur during driving after starting of an engine, in order to reduce the baulking occurrence, the odd-stage clutch and the even-stage clutch of the DCT may continually be engaged or disengaged depending on the position of the shift lever.

When the position of the shift lever is re-ascertained as a P range by the re-ascertaining step S40, the third engaging step S50 may engage 1st stage shift gears after disengaging the odd-stage clutch.

For example, in the case that the shift lever has moved to P range through R range during driving, the odd-stage clutch is rotating in engaged state and the odd shift gears are in neutral positions. When the 1st stage shift gears are engaged after disengaging of the odd-stage clutch, it is possible to reduce the baulking phenomenon.

Also, when the position of the shift lever is re-ascertained as an R range by the re-ascertaining step S40, the third engaging step S50 may engage R stage shift gears after disengaging the even-stage clutch and moves the odd shift gears to neutral position after disengaging the odd-stage clutch.

That is, when the shift lever is positioned at R range during driving, the odd-stage clutch is able to be rotated to prepare for later baulking phenomenon by engaging it after moving the odd-stage shift gears to neutral positions, the R stage shift gears may engage without causing the baulking phenomenon by engaging them after disengaging the even-stage clutch from the engaged state.

Also, when the position of the shift lever is re-ascertained as an N range or a D range by the re-ascertaining step S40, the third engaging step S50 may engage the 1st stage shift gears after disengaging the odd-stage clutch and moves even-stage shift gears to neutral position after engaging the even-stage clutch.

That is, in the case that the shift lever is positioned at N range or D range, since the odd-stage clutch rotates in the engaged stage, the 1st stage shift gears is able to be engaged without the baulking phenomenon by engaging them after disengaging the odd-stage clutch from the engaged state. Meanwhile, the even-stage clutch is able to be rotated to prepare for later baulking phenomenon by engaging it after moving the even-stage shift gears to neutral positions from the R stage shift gears. FIG. 3 illustrates the working state of the odd-stage clutch and the even-stage clutch of a DCT according to the above forms. For reference, in FIG. 3, "Gear Odd" and "Clutch Odd" mean odd-stage shift gears and an odd-stage clutch; and "Gear Even" and "Clutch Even" mean even-stage shift gears and an even-stage clutch. The denoting of "Open" of clutch means a disengaged state of the clutch and "Close" means an engaged state of the clutch.

According to the various forms of the present disclosure, it is possible to reduce the probability of occurrence of the baulking phenomenon in a DCT-mounted vehicle, and improve marketability of vehicle by shortening the engaging time in shifting gears and reducing delays of shifting and abrupt starting of vehicle.

Further, it is possible to reduce the probability of occurrence of the baulking phenomenon regardless of an engine cranking or vehicle driving.

Although forms of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A method for reducing baulking of a dual clutch transmission (DCT) for a vehicle comprising:
    a first engaging step of engaging an odd-stage clutch and an even-stage clutch of the DCT in a case of ignition-on;
    an ascertaining step of ascertaining a range positioned by a shift lever when an engine is cranked after the first engaging step; and
    a second engaging step of engaging shift gears respectively, after disengaging at least one of the odd-stage clutch and the even-stage clutch depending on the ascertained range of the shift lever.

2. The method of claim 1, wherein when the position of the shift lever is ascertained as a P range by the ascertaining step, the second engaging step engages 1st stage shift gears and R stage shift gears respectively, after disengaging both of the odd-stage clutch and the even-stage clutch.

3. The method of claim 1, wherein when the position of the shift lever is ascertained as an N range by the ascertaining step, the second engaging step engages 1st stage shift gears after disengaging the odd-stage clutch, maintains the even-stage clutch engaged, and leaves even-stage shift gears at neutral position.

4. The method of claim 1, further comprising:
    a re-ascertaining step of ascertaining again a range positioned by the shift lever after the second engaging step; and
    a third engaging step of engaging shift gears respectively, after disengaging at least one of the odd-stage clutch and the even-stage clutch depending on the re-ascertained range of the shift lever.

5. The method of claim 4, wherein when the position of the shift lever is re-ascertained as a P range by the re-ascertaining step, the third engaging step engages 1st stage shift gears after disengaging the odd-stage clutch.

6. The method of claim 4, wherein when the position of the shift lever is re-ascertained as an R range by the re-ascertaining step, the third engaging step engages R stage shift gears after disengaging the even-stage clutch and moves odd-stage shift gears to neutral position after disengaging the odd-stage clutch.

7. The method of claim 5, wherein when the position of the shift lever is re-ascertained as one of an N range and a D range by the re-ascertaining step, the third engaging step engages 1st stage shift gears after disengaging the odd-stage clutch and moves even-stage shift gears to neutral position after engaging the even-stage clutch.

* * * * *